(12) United States Patent
Kawano et al.

(10) Patent No.: US 8,311,371 B2
(45) Date of Patent: Nov. 13, 2012

(54) OPTICAL MODULATION DEVICE

(75) Inventors: Kenji Kawano, Atsugi (JP); Masaya Nanami, Zama (JP); Hiroaki Senda, Isehara (JP); Takeshi Hondo, Atsugi (JP); Seiji Uchida, Atsugi (JP); Yuji Sato, Atsugi (JP); Toru Nakahira, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 819 days.

(21) Appl. No.: 11/884,407

(22) PCT Filed: Feb. 16, 2006

(86) PCT No.: PCT/JP2006/302733
§ 371 (c)(1),
(2), (4) Date: Oct. 8, 2009

(87) PCT Pub. No.: WO2006/088093
PCT Pub. Date: Aug. 24, 2006

(65) Prior Publication Data
US 2010/0054654 A1   Mar. 4, 2010

(30) Foreign Application Priority Data

Feb. 17, 2005 (JP) ................................ 2005-040883
Nov. 9, 2005 (JP) ................................ 2005-324625

(51) Int. Cl.
  *G02F 1/035* (2006.01)
  *G02B 6/42* (2006.01)
  *G02B 6/12* (2006.01)

(52) U.S. Cl. ................. 385/3; 385/14; 385/45; 385/132

(58) Field of Classification Search ................. 385/1–3, 385/8–9, 14, 45, 132
See application file for complete search history.

(56) References Cited

U.S. PATENT DOCUMENTS

| 2002/0159666 A1 | 10/2002 | Gates, II et al. | |
| 2003/0228081 A1* | 12/2003 | Tavlykaev et al. | 385/3 |
| 2004/0062466 A1* | 4/2004 | Porte et al. | 385/3 |
| 2006/0120654 A1* | 6/2006 | Aoki et al. | 385/2 |

FOREIGN PATENT DOCUMENTS

| JP | 08-110503 | 4/1996 |
| JP | 2002-350796 | 12/2002 |
| WO | WO2005029165 | * 5/2005 |

* cited by examiner

*Primary Examiner* — Uyen Chau N Le
*Assistant Examiner* — Michael Mooney
(74) *Attorney, Agent, or Firm* — Greer, Burns & Crain, Ltd.

(57) ABSTRACT

Herein disclosed is an optical modulation device, comprising: a substrate 1 having a polarization non-reversal region 17a and a polarization reversal region 17b; an optical waveguide 18 including first and second branched optical waveguide portions 18a, 18b; and a traveling waveguide including a center electrode 19a and a ground electrode 19b, 19c to have an electric signal applied thereto, said traveling waveguide and said first and second branched optical waveguide portions collectively forming an interaction portion to have said incident light interacted with said electric signal, said interaction portion being constituted by a first interaction sub-portion 20a and a second interaction sub-portion 20b, said first and second interaction sub-portions being respectively positioned in regions of said substrate having opposite polarization orientations with each other, in which said center electrode is positioned in face to face relationship with one of said first and second branched optical waveguide portions at said first and second interaction sub-portion to ensure that said incident light in said first and second branched optical waveguide portions are phase modulated, and in which said interaction portion includes an optical waveguide shift sub-portion sandwiched between said first and second interaction sub-portions to have positions of said first and second branched optical waveguide portions shifted therein in a transverse direction, ensuring that positions of said first and second optical waveguides relative to said center and ground electrodes are interchanged between said first and second interaction sub-portions.

14 Claims, 13 Drawing Sheets 17a  17b 21a  21b  21c

OPTICAL MODULATION DEVICE

TECHNICAL FIELD

The present invention relates to an optical modulation device having a small size with low power consumption.

BACKGROUND ART

Up until now, there has been developed an optical modulation device such as a traveling wave electrode type of lithium niobate optical modulation device (hereinafter simply referred to as an LN optical modulation device) comprising a substrate (hereinafter simply referred to as an LN substrate) made of a material such as lithium niobate ($LiNbO_3$) having an electro-optic effect to cause a refractive index of an incident light to be varied in response to an electric field applied to the substrate, thereby making it possible to form an optical waveguide and a traveling wave electrode in and on the substrate. The LN optical modulation device can be applied to a large volume optical transmission system having a capacity in the range of 2.5 Gbit/s to 10 Gbit/s due to the excellent chirping characteristics. In recent years, the LN optical modulation device thus constructed is under review to be applied to the optical transmission system having a super large capacity of 40 Gbit/s and therefore expected as a key device in this technological field.

First Example of the Prior Art

FIG. 7 is a perspective view showing an LN optical modulation device formed with a z-cut LN substrate 1 according to the first example of the prior art. FIG. 8 is a cross sectional view taken along the line A-A' of FIG. 7. The LN optical modulation device comprises a z-cut LN substrate 1, a buffer layer 2 made of $SiO_2$, and a Mach-Zehnder optical waveguide 3. The optical waveguide is formed by depositing a metal titanium, and thermally diffusing the metal titanium at 1050° C. for approximately 10 hours, and thus constitutes a Mach-Zehnder interferometer system (or a Mach-Zehnder optical waveguide). The optical waveguide is divided into two arms 3a and 3b, i.e., a first branched optical waveguide portion and a second branched optical waveguide portion, respectively, to form a portion (hereinafter simply referred to as an interaction portion) to allow incident lights interacted with an electric signal.

The LN optical modulation device further comprises a traveling wave electrode 4 exemplified by a coplanar waveguide (CPW) including a center electrode 4a and two ground electrodes 4b and 4c, the CPW assumed to be used in this example.

The $SiO_2$ buffer layer 2 is placed between the z-cut LN substrate 1 and the traveling wave electrode 4 generally having a thickness of 400 nm to 1 μm. The buffer layer 2 serves to prevent an incident light in the optical waveguide from being attenuated by a metal (generally made of Au) of the traveling wave electrode 4 formed with a center electrode 4a, and ground electrodes 4b and 4c. The buffer layer 2 also serves to reduce a microwave equivalent refractive index "$n_m$" of the electric signal traveling through the traveling wave electrode 4 (i.e., microwave equivalent refractive index of the traveling wave electrode) to be close to an equivalent refractive index of the incident lights passing through the first and the second branched optical waveguide portions 3a and 3b (i.e., equivalent refractive index of the optical waveguide), and serves to make a characteristic impedance of the traveling wave electrode 4 close to 50Ω.

FIG. 9 is a schematic view showing distribution of electric force lines 5 under the condition that the electric signal is applied between the center electrode 4a and the ground electrodes 4b and 4c of the traveling wave electrode. As can clearly be shown in FIG. 9, the electric force lines 5 overlapping the first branched optical waveguide portion 3a and the second branched optical waveguide portion 3b have respective directions opposite with each other. Accordingly, the incident lights passing through the first and second branched optical waveguide portions 3a and 3b are respectively phase-shifted with an amount of $\Delta\phi1$ and $\Delta\phi2$ having respective signs opposite with each other, where the second branched optical waveguide portion 3b is positioned below the center electrode 4a, while the first branched optical waveguide portion 3a is positioned below the ground electrode 4b. The Mach-Zehnder optical waveguide can realize the optical output in the "OFF" state by setting the phase difference $\Delta\phi t$ ($=|\Delta\phi1|+|\Delta\phi2|$) at π between the incident lights respectively passing through the first and the second branched optical waveguide portions 3a and 3b, thereby making it possible to generate an optical signal pulse.

The z-cut LN optical modulation device according to the first example of the prior art, however, encounters such a problem that the pulse is deteriorated in shape after transmitting through a single mode optical fiber having a length of approximately several tens of kilometers. This problem is referred to as a chirping problem, and will now be described hereinafter.

As can be understood from FIG. 9, the width of the center electrode 4a is narrower than those of the ground electrodes 4b and 4c, the width being substantially equal to the width of the second branched optical waveguide portion 3b ranging approximately from 6 μm to 11 μm. This results in high interaction efficiency between the incident light and the electric force lines 5 under the condition that the incident light is passing through the second branched optical waveguide portion 3b below the center electrode 4a. On the other hand, the electric force lines 5 extending from the center electrode 4a to the ground electrodes 4b and 4c tend to widespread due to the fact that each of the ground electrodes 4b and 4c has wide surface. The interaction efficiency between the incident light and the electric force lines 5, therefore, becomes low under the condition that the incident light is passing through the first branched optical waveguide portion 3a below the ground electrode 4b. These interaction efficiencies have an approximated relationship as below.

$$|\Delta\phi1|\approx5|\Delta\phi2|$$

The LN optical modulation device according to the first example of the prior art, therefore, generates the optical signal pulse with chirping. The degree of chirping can be represented by an alpha parameter (i.e., "α" parameter), wherein the alpha parameter is represented by a phase "φ" and amplitude "E" in the formula (1) (disclosed in non-patent document 1).

$$\alpha = [d\phi/dt]/[(1/E)(dE/dt)] \quad (1)$$

As can be seen in the above, the "α" parameter is calculated with an amount of phase shift and an amount of intensity variation of the optical signal pulse outputted from the optical modulation device.

The "α" parameter can be represented by a formula (2) further developed from the formula (1).

$$\alpha = (\Gamma1-\Gamma2)/(\Gamma1+\Gamma2) \quad (2)$$

"Γ1": An efficiency normalized by the numerical number 1 in the form of overlap integration between the amplitude of the electric signal and the power of the incident light passing through the first branched optical waveguide portion 3a.

"T2": An efficiency normalized by the numerical number 1 in the form of overlap integration between the amplitude of the electric signal and the power of the incident light passing through the second branched optical waveguide portion 3b.

As described above, the optical modulation device according to the first prior art serves to generate an optical signal pulse with a chirping by the reason that the phase shift caused by the first branched optical waveguide portion 3a positioned below the ground electrode 4b and the phase shift caused by the second branched optical waveguide portion 3b positioned below the center electrode 4a have respective absolute values different from each other.

Second Example of the Prior Art

FIG. 10 is a schematic view showing an LN optical modulation device according to the second example of the prior art. This example is raised to solve the problem encountered by the optical modulation device according to the first example of the prior art shown in FIG. 7. The constitutional elements of the second example of the prior art which are the same as those of the first example of the prior art will not be described but bear the same reference numerals and legends as those of the first example of the prior art.

As shown in FIG. 10, the LN optical modulation device according to the second example of the prior art comprises two center electrodes 6a and 6b, and ground electrodes 7a, 7b and 7c. There are two CPWs, generally in combination referred to as two-electrode type or push-pull type CPW traveling wave electrode, raised in this second example. Each of the two CPWs is identical with the CPW raised in the first example of the prior art. FIG. 10 additionally shows electric force lines 8. The optical modulation device according to this second embodiment has been considered to realize the zero chirping in principle by the reason that the amounts of phase shift in the first and the second branched optical waveguide portions 3a and 3b have the same absolute values each having an opposite sign with each other. This comes from the fact that the first and the second branched optical waveguide portions 3a and 3b are respectively positioned below the center electrodes 6a and 6b of the two CPWs with the center electrodes equal in width.

However, the fact that the phase shifts of the respective first and second branched optical waveguide portions 3a and 3b must have the same absolute values with opposite signs with each other makes it difficult to operate the optical modulation device of the second example. This results from the fact that it is extremely difficult to correctly apply the electric signals to the center electrodes 6a and 6b in such a way that the electric signals have the same absolute values and opposite signs with each other. In other words, the two electric signals having opposite phase outputted from two distinct output ports of an integrated circuit (IC) must be applied to the two center electrodes while precisely maintaining the phase relationship with each other. This means that the electric lengths must be equal with each other from two distinct output ports of the IC to the respective interaction portions. In addition, the shapes of the leading and trailing edges between the two electric signals must be equal with each other. In practice, the conditions as described above are technically difficult to be cleared by the second example of the prior art.

Third Example of the Prior Art

FIG. 11 is a top view showing the LN optical modulation device according to the third example of the prior art, this example being raised to solve the problem encountered by the optical modulation device according to the second example shown in FIG. 10. FIG. 12 is a cross sectional view taken along the line B-B' of FIG. 11 (disclosed in patent document 1). The constitutional elements of the third example of the prior art the same as those of the first example of the prior art will not be described but bear the same reference numerals and legends as those of the first example of the prior art.

The LN optical modulation device according to the third example of the prior art comprises a Mach-Zehnder optical waveguide 9 including two arms, i.e., first and second branched optical waveguide portions 9a and 9b. The LN optical modulation device further comprises branched center electrodes 10a and 10b, and ground electrodes 11a, 11b and 11c. The z-cut LN substrate 1 has two regions, a region 1a where polarization reversal process is not worked (polarization non-reversal region) and another region 1b where polarization reversal process is worked (polarization reversal region). FIG. 12 schematically shows electric force lines 12.

The operational principle of the optical modulation device according to this example will now be described hereinafter. The incident light in the Mach-Zehnder optical waveguide 9 is divided into two incident lights respectively passing through the first and the second branched optical waveguide portions 9a and 9b. Meanwhile, the center electrode 10 is branched into two branched center electrodes 10a and 10b as shown in FIG. 12 to have the branched electric signals applied to the first and the second branched optical waveguide portions 9a and 9b with the same directions.

The z-cut LN optical modulation device is produced under the thermal diffusion of the titanium Ti for production of the optical waveguide on the −z surface of the z-cut LN substrate to clear a suitable diffusion condition. This means that the titanium thermal diffusion is conducted on the −z surface at the polarization non-reversal region while the titanium thermal diffusion is conducted on the +z surface at the polarization reversal region in this example. When an electric field is applied to the two regions having respective −z surface and +z surface, the variations of the refractive index at the two regions have the same absolute values and opposite signs with each other.

In this third example, the z-cut LN substrate 1 has a boundary formed between the polarization non-reversal region and the polarization reversal region at the middle of the first and the second branched optical waveguide portions. This results in the fact that the incident lights passing through the first and the second branched optical waveguide portions 9a and 9b are phase-shifted with the amounts having opposite signs with each other under the condition that the electric force lines 12 have the same directions with each other as shown in FIG. 12. Therefore, it has so far been attempted to have the zero chirping achieved under the condition that the incident lights passing through the first and the second branched optical waveguide portions 9a and 9b are phase-shifted with the amounts equal in absolute value and opposite signs with each other.

The optical modulation device according to this example, however, encounters such a problem as will be described hereinafter.

The LN optical modulation devices are manufactured from a z-cut LN substrate having a diameter of 3 to 4 inches. The first and the second branched optical waveguide portions 9a and 9b of each LN optical modulation device are separated with each other with a gap of 15 to 30 μm. The manufacturing process of the optical waveguide among the manufacturing processes of the optical modulation device according to the third example of the prior art shown in FIG. 11 will now be described.

Firstly, the polarization reversal process is worked to a half region of the LN substrate, the half region and another half region having a boundary at the middle of the first and the second branched optical waveguide portions 9a and 9b of the Mach-Zehnder optical waveguide 9. To reverse the polarization, electrodes are patterned on the upper and lower surfaces of the whole desired region of the z-cut LN substrate 1 so that a high voltage is applied to the electrodes to produce the reversed polarization domain between the upper and lower surfaces of the whole desired region of the z-cut LN substrate 1. The electrodes are then removed with an etching method from the upper and lower surfaces of the whole desired region of the z-cut LN substrate 1. Next, a photoresist pattern of the Mach-Zehnder optical waveguide is formed to ensure that the boundary of the polarization reversal region is formed between the first and the second branched optical waveguide portions 9a and 9b of the photoresist pattern. A metal titanium is then formed on the upper surface of the z-cut LN substrate 1 with the methods of vapor deposition and liftoff. Finally, the Mach-Zehnder optical waveguide 9 is formed by the above formed metal titanium with the method of thermal diffusion.

The metal titanium forming the optical waveguide in the polarization non-reversal region 1a of the z-cut LN substrate is diffused in the manner different from that in the polarization reversal region 1b. This stems from the fact that the solid state properties in the polarization non-reversal region 1a and in the polarization reversal region 1b are different from each other. The difference of the solid state properties results in the fact that the optical waveguides in the polarization non-reversal region 1a and in the polarization reversal region 1b respectively have the spot sizes and the propagation losses different from each other.

The fact that the incident lights passing through the first branched optical waveguide portion 9a in the polarization non-reversal region 1a and the second branched optical waveguide portion 9b in the polarization reversal region 1b have respective spot sizes different from each other results in the fact that the electric signals overlap the incident lights in the first and the second branched optical waveguide portions 9a and 9b with interaction efficiencies different from each other (The interaction efficiency is generally represented by the overlap integration of an electric signal power and an incident light power). In this example, the electric signals are transmitted through the traveling wave electrodes constituted by the branched center electrodes 10a and 10b and the ground electrodes 11a and 11b.

As described above with reference to FIG. 9 in the first example of the prior art, the output light with the chirping is outputted from the LN optical modulation device under the condition that the incident lights transmitted through the first and the second branched optical waveguide portions 9a and 9b are phase-shifted with respective absolute values different from each other. The third example of the prior art, therefore, cannot achieve the object of extremely reducing the chirping.

In addition, the propagation losses in the polarization non-reversal region 1a and in the polarization reversal region 1b are different from each other, thus the output powers of the incident lights from the first and the second branched optical waveguide portions 9a and 9b being different from each other. This results in the fact that the optical modulation device according to the third prior art has an additional problem that the extinction ratio is deteriorated in the "OFF" state.

Moreover, this prior art encounters an undesirable problem that, as shown in FIG. 11, the center electrode 10 is required to be divided into the two branched center electrodes 10a and 10b at the interaction portion to interact the electric signals with the incident lights. In this case, the unseparated portion of the electrode 10 has a low impedance of 25Ω under the condition that the impedances of the branched center electrodes 10a and 10b are set at 50Ω. On the other hand, the branched center electrodes 10a and 10b each has a high impedance of 100Ω under the condition that the impedance of the unseparated portion of the electrode 10 is set at 50Ω. Both of these cases have an impedance mismatching problem in principle. In addition, the bifurcation portion where the center electrode 10 is divided into two branched center electrodes 10a and 10b serves as a discontinuity portion to discontinue the flow of the electric signals, i.e., the electric current. This results in the electric reflection caused at the bifurcation portion. Furthermore, the LN optical modulation device has such a problem that the electric reflection characteristic (S11 characteristic) is largely affected by the fact of whether the bifurcation portion is precisely formed or not. As a result, the preciseness of the bifurcation portion has a large effect on the yield rate of the LN optical modulation device.

Fourth Example of the Prior Art

FIG. 13 is a top view showing the LN optical modulation device according to the fourth example of the prior art disclosed in patent document 2.

The LN optical modulation device according to the fourth example of the prior art has a Mach-Zehnder optical waveguide 13 constituted by a first branched optical waveguide portion 13a and a second branched optical waveguide portion 13b each extended from a region 15a where polarization reversal process is not worked (polarization non-reversal region) to another region 15b where polarization reversal process is worked (polarization reversal region).

The LN optical modulation device according to the fourth example of the prior art shown in FIG. 13 has distinctive characteristics with regard to positions of the center and the ground electrodes 14a to 14c relative to the first and the second branched optical waveguide portions 13a and 13b. In other words, the center electrode 14a is positioned above the second branched optical waveguide portion 13b while the ground electrode 14b is positioned above the first branched optical waveguide portion 13a in the polarization non-reversal region 15a. Here, the reference numeral 16a represents an interaction portion in the polarization non-reversal region 15a.

On the other hand, the center electrode 14a and the ground electrodes 14b and 14c of the traveling wave electrode are shifted in the surface direction of the LN substrate at the shift portion 16c. This results in the fact that the center electrode 14a is positioned above the first branched optical waveguide portion 13a while the ground electrode 14c is positioned above the second branched optical waveguide portion 13b in the polarization reversal region 15b. Here, the reference numeral 16b represents an interaction portion in the polarization reversal region 15b.

In this fourth example of the prior art, the center electrode 14a has two portions respectively extending in the polarization non-reversal region 15a and in the polarization reversal region 15b having equal lengths L/2. This constitution is aimed to eliminate the chirping of the output light by equalizing traveling distances of the incident light in the polarization non-reversal region 15a and the polarization reversal region 15b for each of the first and the second branched optical waveguide portions 13a and 13b.

However, the LN optical modulation device according to the fourth example of the prior art encounters such problems as requiring an advanced manufacturing know-how, and having deteriorated electric signal characteristics, i.e., microwave characteristics, resulting from the existence of the shift portion 16c. The center electrode 14a has a narrow width of 6 to 11 μm while the center electrode 14a and the ground electrodes 14b and 14c are narrowly separated with gaps of 15 μm at each of the interaction portion 16a of the polarization non-reversal region 15a and the interaction portion 16b of the polarization reversal region 15b. In addition, each of the center electrode 14a and the ground electrodes 14b and 14c has a large thickness of 20 to 30 μm.

The traveling wave electrode is formed through the process of coating a resist thicker than the intended thickness of the traveling wave electrode, forming a pattern of traveling wave electrode by the resist, and coating a metal. In such a case, the LN optical modulation device requires an advanced technique to fabricate the traveling wave electrode having a high aspect ratio with the narrow gap between the center electrode 14a and the ground electrodes 14b and 14c. (The aspect ratio is determined by the ratio of the height to the width of the center electrode 14a, the aspect ratio having a range of 2 to 5 in this example.) Moreover, the fabrication of the thick photoresist pattern through the process of exposure and development is troublesome due to the fact that the photoresist pattern of the traveling wave electrode is shifted at the shift portion. This results in the low process yield for fabricating the traveling wave electrode.

Furthermore, the shift portion 16c serves as a discontinuity portion to the electric signal. The fact that the microwave, that is, the electric signal is transmitted through the center electrode 14a and the ground electrodes 14b and 14c is equivalent to the fact that a high frequency current is passed through the traveling wave electrode. Accordingly, the electric signal tends to be reflected at the shift portion 16c, that is, the discontinuity portion of the center electrode 14a.

FIG. 14 is a graph showing the measured transmission characteristic "S21" of the electric signal transmitted through the traveling wave electrode of the LN optical modulation device according to this example. In FIG. 14, the dashed-dotted line "I" represents a reference level of the electric signal measured without inserting the LN optical modulation device. The dashed line "II" represents a detected level of the electric signal measured with the traveling wave electrode imperfectly formed. The dotted line "III" represents a detected level of the electric signal with the traveling wave electrode formed relatively fine.

As seen in FIG. 14, the line "II", representing the imperfectly formed traveling wave electrode, shows that the characteristic "S21" of the microwave has large dips indicating a large electric reflection. Even when the traveling wave electrode is formed relatively fine, the characteristic "S21" is indicated by a line with a winding shape to some extent, and has a comparatively large transmission loss (indicated by the inclination of the line in response to the frequency). In this case, the reflection characteristic represented by "S11" is also deteriorated.

The deterioration of the characteristic "S21" indicates that the electric signals are ineffectively superimposed on the first and the second branched optical waveguide portions 13a and 13b, which eventually hinders the realization of the wideband modulation. As is well known, a bandwidth of the electric signal within 6 dB deterioration corresponds to the optical modulation bandwidth within 3 dB deterioration under the condition that the velocity matching is achieved between the electric signal and the incident light. This leads to the fact that the deterioration of the characteristic "S21" caused by the discontinuity portion at the shift portion 16c renders the modulation bandwidth extremely narrow, thus resulting in difficulty in generating an optical signal pulse appropriate for the optical communication system. Moreover, the electric reflection and the transmission loss of the electric signal at the shift portion 16c are dramatically increased in case that the LN optical modulation device is applied to the high-speed transmission system having a capacity of 40 Gbit/s.

In the fourth example of the prior art, the traveling distances of the incident light in the polarization non-reversal region 15a and in the polarization reversal region 15b are set to be equal with each other for each of the first and the second branched optical waveguide portions 13a and 13b. This setting is aimed to have the LN optical modulation device generate an optical signal pulse with zero chirping.

However, as the electric signal is transmitted through the traveling wave electrode formed by the center electrode 14a and the ground electrodes 14b and 14c, the electric signal is attenuated due to the conductor loss of the traveling wave electrode under the condition that the electric signal has high frequency. The intensity of the electric signal in the polarization reversal region 15b is, therefore, weaker than that of the electric signal in the polarization non-reversal region 15a in spite of the fact that the polarization non-reversal region 15a and the polarization reversal region 15b respectively have the same lengths L/2. Accordingly, the phase differences of the incident light at the first and the second branched optical waveguide portions 13a and 13b have respective absolute values different from each other, thereby resulting in the fact that the optical signal pulse with chirping is outputted from the LN optical modulation device.

(Patent Document 1)
Japanese Patent Laying-Open Publication No. 2003-202530
(Patent Document 2)
Japanese Patent Laying-Open Publication No. 2002-350796
(Non-Patent Document 1)
Fumio Koyama et al "Frequency Chirping in External Modulators" IEEE Journal of Lightwave Technology, vol. 6, pp. 87-93, January 1988.

DISCLOSURE OF THE INVENTION

Problems to be Solved by the Invention

As aforementioned, there have been developed two types of LN optical modulation devices according to the prior arts with the polarization reversal processed on the LN substrate. One of the LN optical devices is constituted so that the branched center electrodes are respectively placed above the two branched optical waveguide portions of the Mach-Zehnder optical waveguide. The other of the LN optical devices is constituted with the center electrode and the ground electrodes shifted in the surface direction so that the positions of the center and the ground electrodes relative to the first and the second branched optical waveguide portions are interchanged. The former one has such a problem that the impedance mismatching is caused at the bifurcation portion of the center electrode. In addition, the electric reflection is caused at the bifurcation portion due to the fact that the bifurcation portion serves as a discontinuity portion to the current, i.e., the electric signal. The latter one has such a problem that it is required to fabricate the shift portion where the positions of the center and the ground electrodes relative to the first and the second branched optical waveguide portions are interchanged, which is troublesome due to the fact that the center electrode with high aspect ratio must be shifted at the shift portion. Moreover, the shift portion of the traveling wave electrode serves as a discontinuity portion to the electric signal, which results in the electric signal reflected by the shift portion. The microwave characteristics, therefore, tend to be deteriorated in that the characteristic "S21" tends to have dips while the transmission loss is increased, thereby resulting in the narrow optical modulation bandwidth.

Means for Solving the Problems

It is, therefore, an object of the present invention to provide an LN optical modulation device to solve the problems in accordance with the examples of the prior art as described above. According to a first aspect of the present invention, there is provided an LN optical modulation device for generating an optical signal pulse, comprising: a substrate having an electro-optic effect, the substrate having a polarization non-reversal region and a polarization reversal region; an optical waveguide formed upper the substrate including a bifurcation optical waveguide for bifurcating incident light, first and second branched optical waveguide portions for transmitting bifurcated incident lights, and a mixing waveguide for mixing incident lights respectively transmitted by the first and the second branched optical waveguide portions; and a traveling waveguide including a center electrode and a ground electrode to have an electric signal applied thereto, the traveling waveguide and the first and the second branched optical waveguide portions collectively forming an interaction portion to have the incident light interacted with the electric signal, the interaction portion including a first interaction sub-portion and a second interaction sub-portion, the first and second interaction sub-portions being respectively positioned in regions of the substrate having opposite polarization orientations with each other, in which the center electrode is positioned in face to face relationship with one of the first and second branched optical waveguide portions at the first interaction sub-portion and the other of the first and second branched optical waveguide portions at the second interaction sub-portion to ensure that the incident light in the first and second branched optical waveguide portions are phase modulated, and in which the interaction portion further includes an optical waveguide shift sub-portion sandwiched between the first and second interaction sub-portions to have positions of the first and second branched optical waveguide portions shifted therein such that the optical axes of the first optical waveguide at the first and second interaction sub-portions are in spaced relationship with each other while the optical axes of the second optical waveguide at the first and second interaction sub-portions being in spaced relationship with each other, ensuring that positions of said first and second branched optical waveguide portions relative to said center and ground electrodes are interchanged between said first and second interaction sub-portions.

According to a second aspect of the present invention, there is provided an LN optical modulation device, in which the first and second interaction sub-portions have longitudinal lengths equal to each other.

According to a third aspect of the present invention, there is provided an LN optical modulation device, in which the first interaction sub-portion has a longitudinal length shorter than the longitudinal length of the second interaction sub-portion.

According to a fourth aspect of the present invention, there is provided an LN optical modulation device, in which the substrate has at least one of additional polarization non-reversal region and additional polarization reversal region sectioned in the interaction portion, and has at least one additional optical waveguide shift sub-portion to ensure that the optical waveguide shift sub-portions are respectively sectioned over boundaries of the polarization reversal regions and the polarization non-reversal regions.

According to a fifth aspect of the present invention, there is provided an LN optical modulation device, in which the addition of the polarization non-reversal regions and the polarization reversal regions in number amounts to odd numbers other than "1" in numerical number.

According to a sixth aspect of the present invention, there is provided an LN optical modulation device, in which total longitudinal length of the polarization non-reversal regions and total longitudinal length of the polarization reversal regions in the interaction portion are equal to each other.

According to a seventh aspect of the present invention, there is provided an LN optical modulation device, in which the optical signal pulse is smaller in chirping than that of the optical signal pulse outputted by a substitute optical modulation device having a substitute substrate sectioned by either one of the polarization non-reversal region and the polarization reversal region.

According to a eighth aspect of the present invention, there is provided an LN optical modulation device, in which the center electrode of the interaction portion is formed substantially straight.

According to a ninth aspect of the present invention, there is provided an LN optical modulation device, in which part of the center electrode is formed substantially parallel to one of the first and second branched optical waveguide portions at the optical waveguide shift sub-portion.

Advantageous Effect of the Invention

The optical modulation device according to the present invention makes it possible to prevent the electric signal, i.e., the microwave from deterioration because of the fact that the traveling wave electrode at the interaction portion, where high fabrication technique is required, is simply formed straight. In addition, the branched optical waveguide portions are shifted to ensure that the positions of the first and the second branched optical waveguide portions relative to the center and the ground electrodes are interchanged between the adjacent interaction sub-portions. This leads to the fact that the optical modulation device according to the present invention can realize the wide optical modulation bandwidth by the reason that the deterioration of the electric signal is reduced, while suppressing the chirping of the optical signal by interchanging the positions of the two branched optical waveguide portions relative to the traveling wave electrode.

DESCRIPTION OF THE REFERENCE NUMERALS

Figure 1:
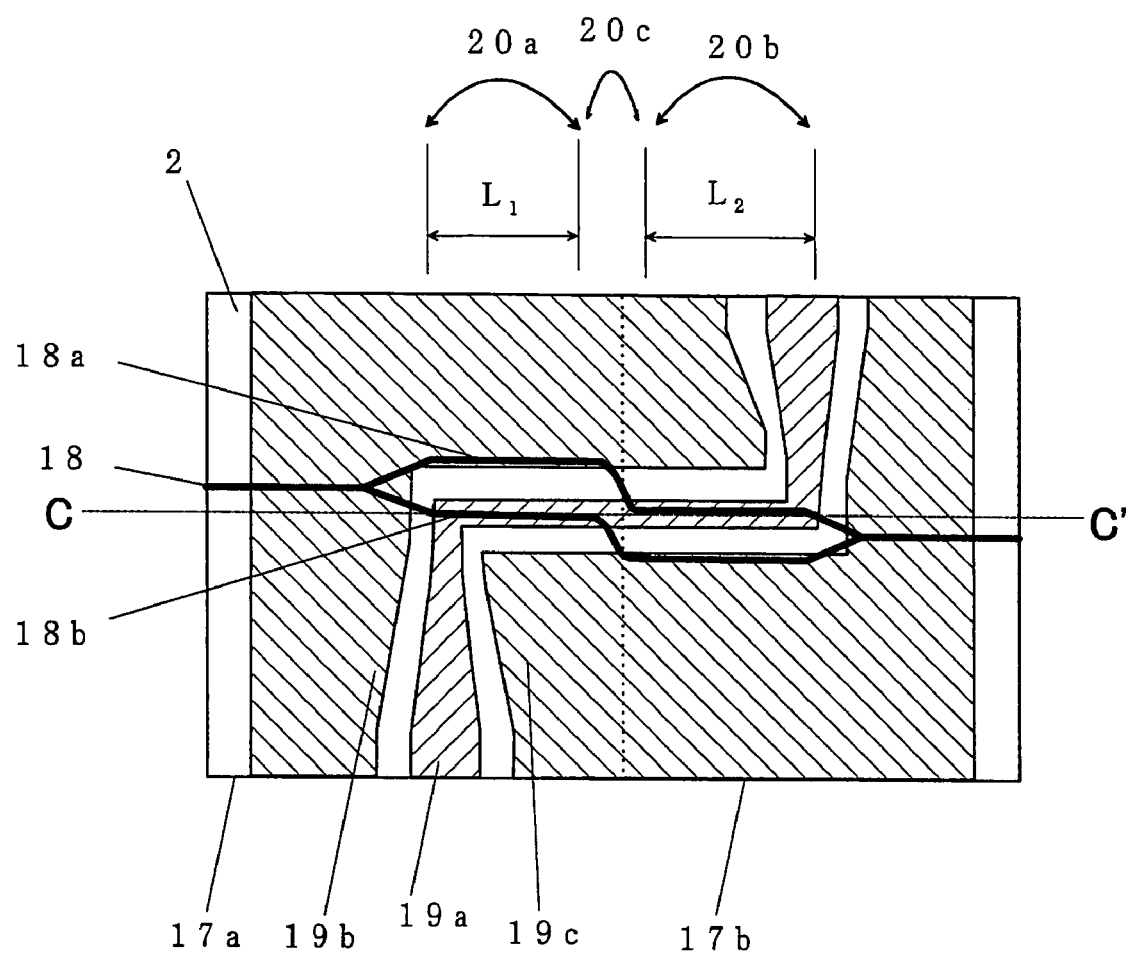
FIG. 1 is a top view showing the optical modulation device according to the first embodiment of the present invention.

1: z-cut LN substrate
2: $SiO_2$ buffer layer
3, 9, 13, 18 and 22: Mach-Zehnder optical waveguide
3a, 9a, 13a, 18a and 22a: first branched optical waveguide portion
3b, 9b, 13b, 18b and 22b: second branched optical waveguide portion
4: traveling wave electrode
4a, 6a, 6b, 10, 10a, 10b, 14a, 19a and 24a: center electrode
4b, 4c, 7a, 7b, 7c, 11a, 11b, 11c, 14b, 14c, 19b, 19c, 24b and 24c: ground electrode
5, 8 and 12: electric force lines
1a, 15a, 17a, 21a and 21c: polarization non-reversal region
1b, 15b, 17b and 21b: polarization reversal region
16a, 20a, 23a and 25a: interaction portion in the polarization non-reversal region (first interaction sub-portion)
16b, 20b, 23b and 25b: interaction portion in the polarization reversal region (second interaction sub-portion)
16c: shift portion
20c, 23d, 23e and 25c: optical waveguide shift sub-portion
23c: interaction portion in the polarization non-reversal region (third interaction sub-portion)

DESCRIPTION OF THE PREFERRED EMBODIMENTS

First Embodiment

Figure 2:
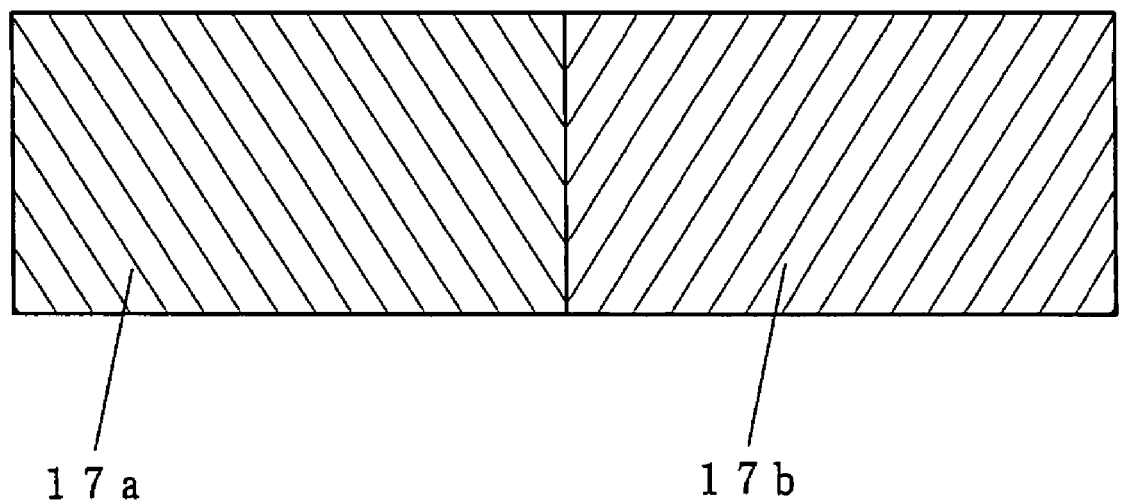
FIG. 2 is a sectional view taken along the line C-C' of FIG. 1.

FIG. 1 is a top view showing the optical modulation device according to the first embodiment of the present invention. FIG. 2 is a sectional view taken along the line C-C' of FIG. 1. The optical modulation device requires a buffer layer made of $SiO_2$ to be mounted on the LN substrate due to the fact that the LN substrate according to this embodiment has a z-cut state, which is the same as the first example of the prior art shown in FIG. 7. However, the $SiO_2$ buffer layer is not shown here to avoid the tedious explanation. The constituent elements such as the traveling wave electrode and the optical waveguide are not shown along with the $SiO_2$ buffer layer in FIG. 2 to exclusively show the z-cut LN substrate.

As shown in FIG. 1, the optical modulation device according to this embodiment comprises a z-cut LN substrate having a region without a polarization reversal (polarization non-reversal region) 17a and a region with a polarization reversal (polarization reversal region) 17b. The optical modulation device further comprises a Mach-Zehnder optical waveguide 18. The Mach-Zehnder optical waveguide 18 includes two arms, that is, a first branched optical waveguide portion 18a and a second branched optical waveguide portion 18b, which may simply be referred to as optical waveguides. The Mach-Zehnder optical waveguide 18 further includes a bifurcation optical waveguide to bifurcate the incident light passing through the Mach-Zehnder optical waveguide 18 into the first and the second branched optical waveguide portions 18a and 18b, and a mixing optical waveguide to mix the bifurcated lights passing through the first and the second branched optical waveguide portions 18a and 18b. The optical modulation device according to this embodiment further comprises a CPW traveling wave electrode constituted by a center electrode 19a and ground electrodes 19b and 19c.

The optical modulation device according to the first embodiment shown in FIG. 1 is characterized in that, for realizing the sufficiently wide optical modulation bandwidth, it has a structure maximally utilizing the specific characteristics of the electric signal which directly determines the optical modulation bandwidth. In other words, the center electrode 19a and the ground electrodes 19b and 19c, having small widths and being separated with narrow gaps, are formed straight not to have any discontinuity portion at the interaction portion where the characteristics of the optical modulation is determined. Instead, the first and the second branched optical waveguide portions 18a and 18b are formed to be shifted at the interaction portion. The optical modulation device has a first interaction sub-portion 20a, where the electric signal and the incident light are interacted with each other in the polarization non-reversal region 17a. The optical modulation device further has a second interaction sub-portion 20b, where the electric signal and the incident light are interacted with each other in the polarization reversal region 17b. The optical modulation device further has an optical waveguide shift sub-portion 20c sandwiched between the first and the second interaction sub-portions 20a and 20b.

As shown in FIG. 1, the center electrode 19a of the first interaction sub-portion 20a is positioned above the second branched optical waveguide portion 18b while the ground electrode 19b is positioned above the first branched optical waveguide portion 18a in the polarization non-reversal region. In other words, the center electrode 19a is positioned in face to face relationship with the second branched optical waveguide portion 18b. On the other hand, the center electrode 19a of the second interaction sub-portion 20b is positioned above the first branched optical waveguide portion 18a while the ground electrode 19c is positioned above the second branched optical waveguide portion 18b in the polarization reversal region. In other words, the center electrode 19a is positioned in face to face relationship with the first branched optical waveguide portion 18a. In this embodiment, the first and the second branched optical waveguide portions 18a and 18b are shifted between the first and the second interaction sub-portions 20a and 20b in the surface direction of the z-cut LN substrate. This results in the fact that the positions of the first and the second branched optical waveguide portions 18a and 18b relative to the center and the ground electrodes 19a to 19c are interchanged with each other. Accordingly, the chirping of the optical signal pulse outputted from the LN optical modulation device can be tremendously suppressed.

In this embodiment, the traveling wave electrode is formed straight, which makes it possible to form the traveling wave electrode without any discontinuity portion where the center electrode 19a has a narrow width in the range of 6 to 11 μm while the center electrode and the ground electrodes 19b and 19c are positioned with narrow gaps of approximately 15 μm in the region where the electric signal and the incident light are interacted with each other, thereby resulting in remarkably high process yield compared to the process yield of the optical modulation device with the discontinuity portion according to the fourth example of the prior art. In addition, neither of the first and the second interaction sub-portions 20a and 20b, where the electric signal and the incident light are interacted with each other, serves as a discontinuity portion. This results in the transmission characteristics "S21" of the electric signal indicating that the traveling wave electrode has no additional transmission loss and electric reflection attributed to the discontinuity portion.

Figure 3:
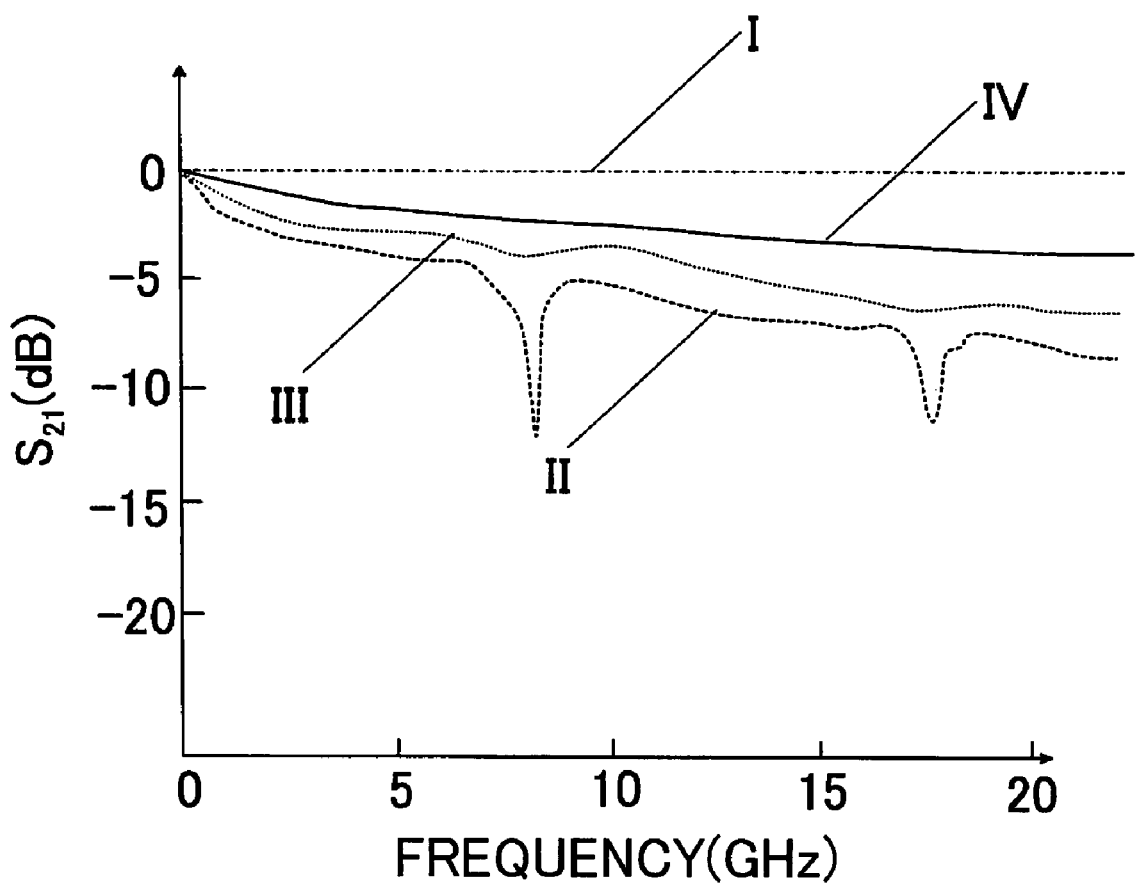
FIG. 3 is a graph showing technical merits according to this invention.
Figure 14:
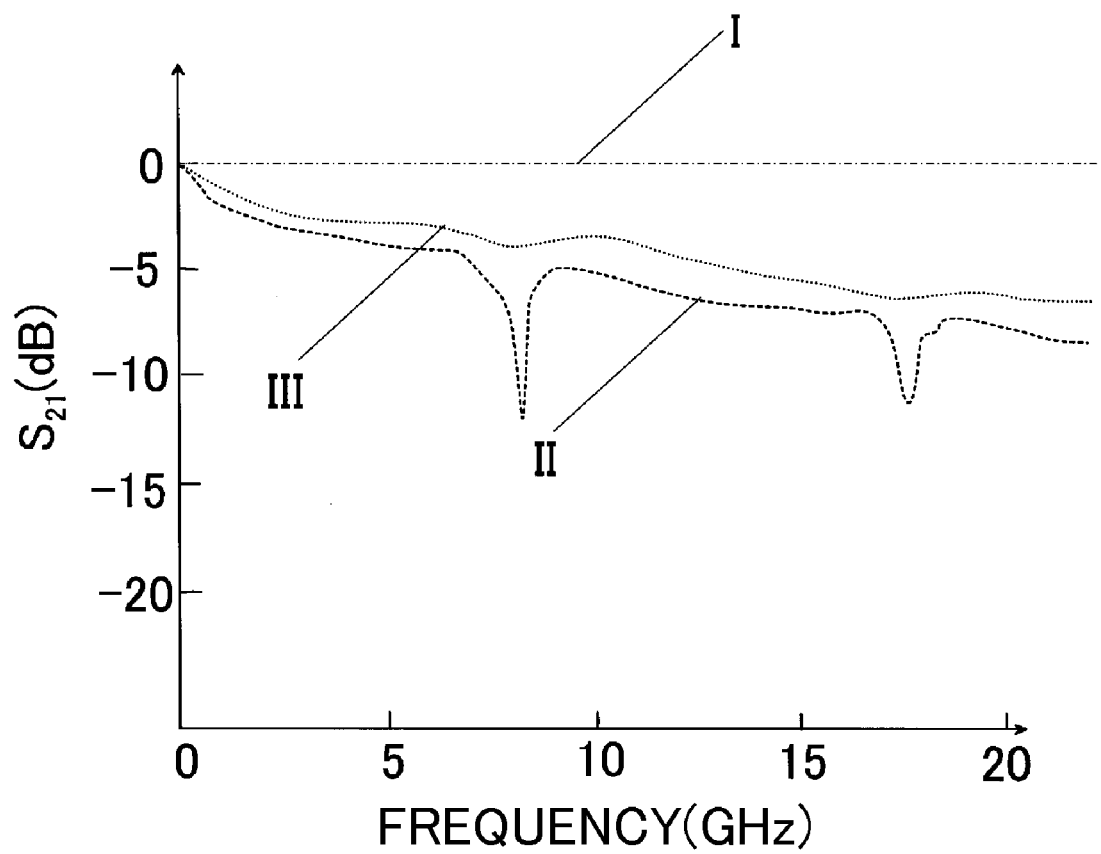
FIG. 14 is a graph to explain the problem encountered by the fourth example of the prior art.

FIG. 3 is a graph showing technical merits of this invention by superimposing a line representing the transmission characteristic "S21" of the optical modulation device according to this embodiment on the lines representing the transmission characteristic "S21" of the optical modulation device raised in the fourth example of the prior art shown in FIG. 14. The line "IV" represents the transmission characteristic according to this embodiment. The lines "I", "II" and "III" in FIG. 3 respectively correspond to the lines "I", "II" and "III" in FIG. 14. More specifically, the line "I" represents a reference level of the electric signal measured without inserting the LN optical modulation device, the line "II" represents a detected microwave level under the condition that the traveling wave electrode is imperfectly formed at the shift portion 16c according to the fourth example of the prior art shown in FIG. 14, and the line "III" represents a detected microwave level of the electric signal with the traveling wave electrode at the shift portion 16c finely formed. As can be understood from FIG. 3, the transmission characteristic "S21" according to this embodiment has less winding than that of the traveling wave electrode with the discontinuity portion raised in the fourth example of the prior art. The transmission characteristic "S21" of this embodiment is improved even compared to the characteristic of the fourth example of the prior art with the finely formed traveling wave electrode.

The reasons that the optical modulation device according to this embodiment has excellent characteristics will be described hereinafter. As aforementioned, the electric current flows through the narrow center electrode when the electric signal, i.e., microwave is transmitted through the traveling wave electrode. Under this condition, the electric current cannot be exuded from the center electrode at the shift portion 16c, i.e., the discontinuity portion according to the fourth example of the prior art shown in FIG. 14. This results in the fact that the microwave, i.e., the electric signal tends to be affected by the discontinuity portion in that the microwave tends to be reflected at the discontinuity portion. Meanwhile, it is well known that the incident light is passed through the optical waveguide with almost no transmission loss. This reason comes from the fact that the incident light exuded from the optical waveguide can return to the optical waveguide under the condition that the optical waveguide has shallow curvature at the discontinuity portion. In other words, the incident lights in the first and the second branched optical waveguide portions 18a and 18b can be transmitted from the first interaction sub-portion 20a to the second interaction sub-portion 20b with virtually no transmission loss under the condition that the first and the second branched optical waveguide portions 18a and 18b each has a bend optical waveguide portion having a curvature radius larger than a predetermined value at the optical waveguide shift sub-portion 20c. As described above, the optical modulation device according to the present invention is operated with the advantageous utilization of the difference in characteristics between the light and the electric signal at the discontinuity portion. This optical modulation device further utilizes the fact that the deterioration of the transmission characteristic "S21" of the optical waveguide merely results in the increase in insertion loss of the incident light without affecting the optical modulation bandwidth which is the most important characteristic for the optical modulation device, while deterioration of the transmission characteristic "S21" of the electrode directly results in the deterioration of the optical modulation characteristic.

Here, it is sufficient for the optical waveguide shift sub-portion 20c to have a length in the range of approximately several hundred micrometers to 1 mm. The driving voltage is not affected by the fact that the incident lights respectively passing through the first and the second branched optical waveguide portions 18a and 18b cannot be phase-shifted at the optical waveguide shift sub-portion 20c, resulting from the fact that the interaction portion where the electric signal and the incident lights are interacted with each other has a sufficient total length (determined by the total length of the first interaction sub-portion 20a and the second interaction sub-portions 20b in this embodiment) in the range of approximately 30 mm to 50 mm.

Figure 7:
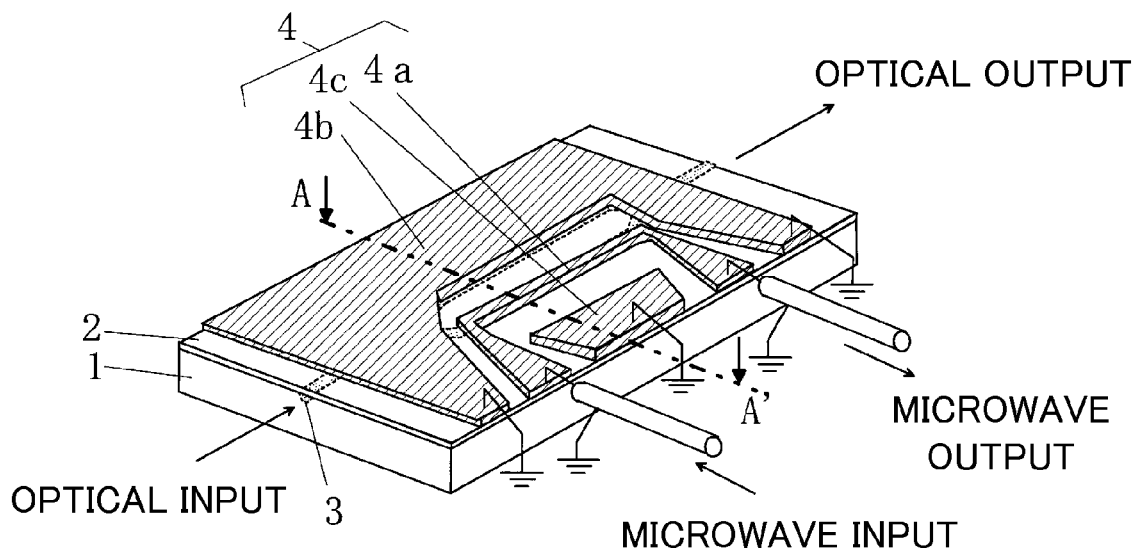
FIG. 7 is a schematic view showing the optical modulation device according to the first example of the prior art.
Figure 8:
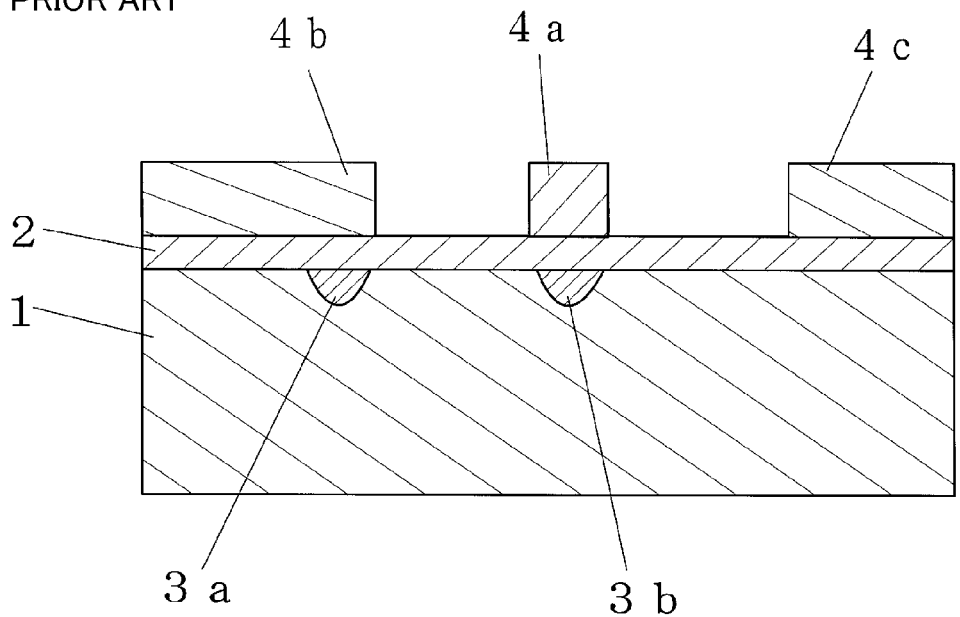
FIG. 8 is a sectional view taken along the line A-A' of FIG. 7.
Figure 9:
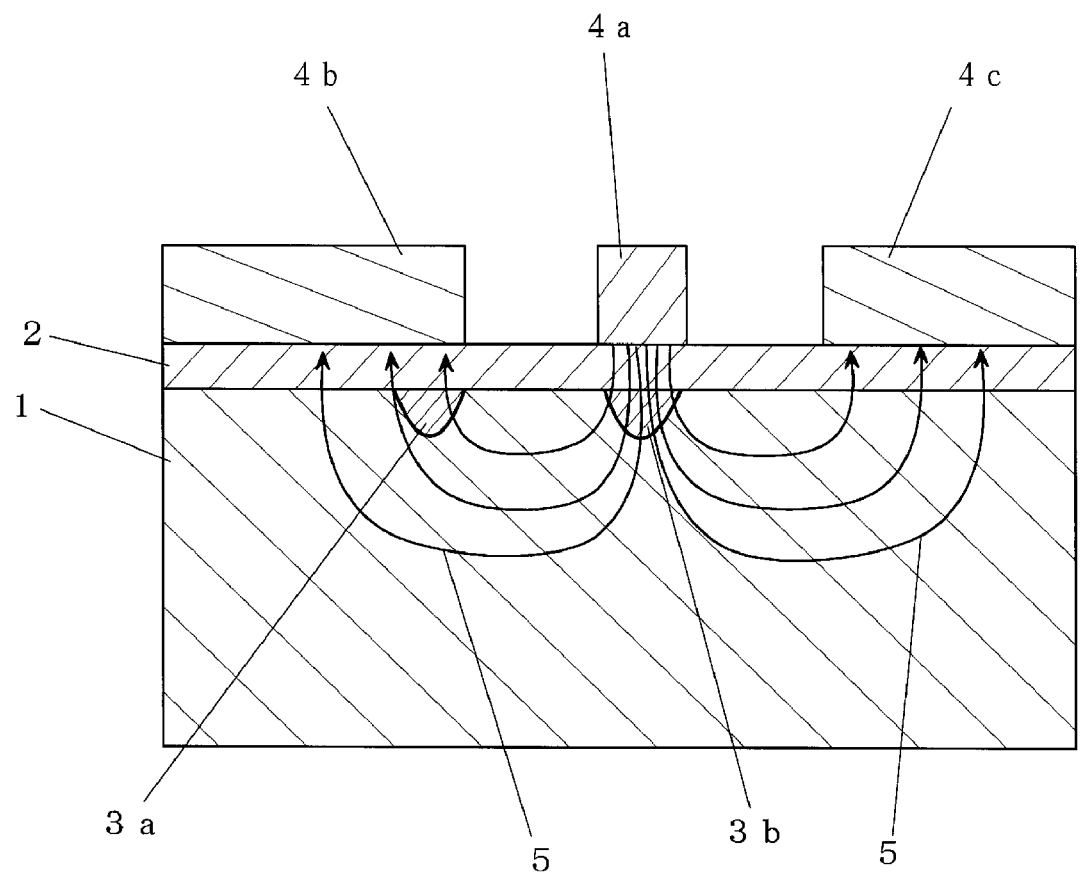
FIG. 9 is a schematic view showing a preferable distribution of electric force lines according to the first example of the prior art.
Figure 10:
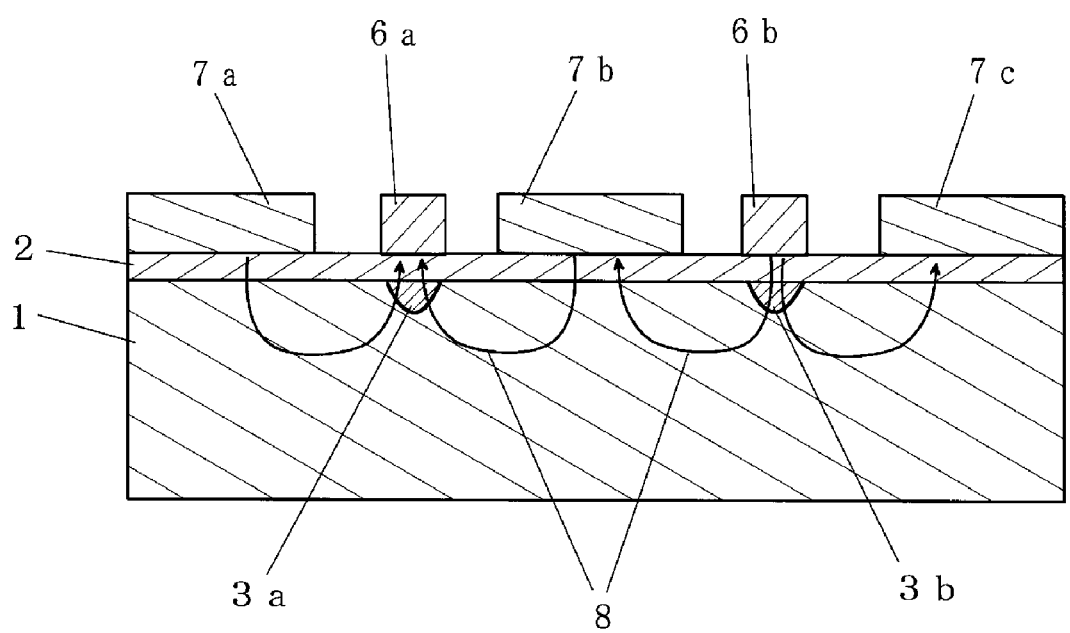
FIG. 10 is a schematic view showing the optical modulation device according to the second example of the prior art.
Figure 11:
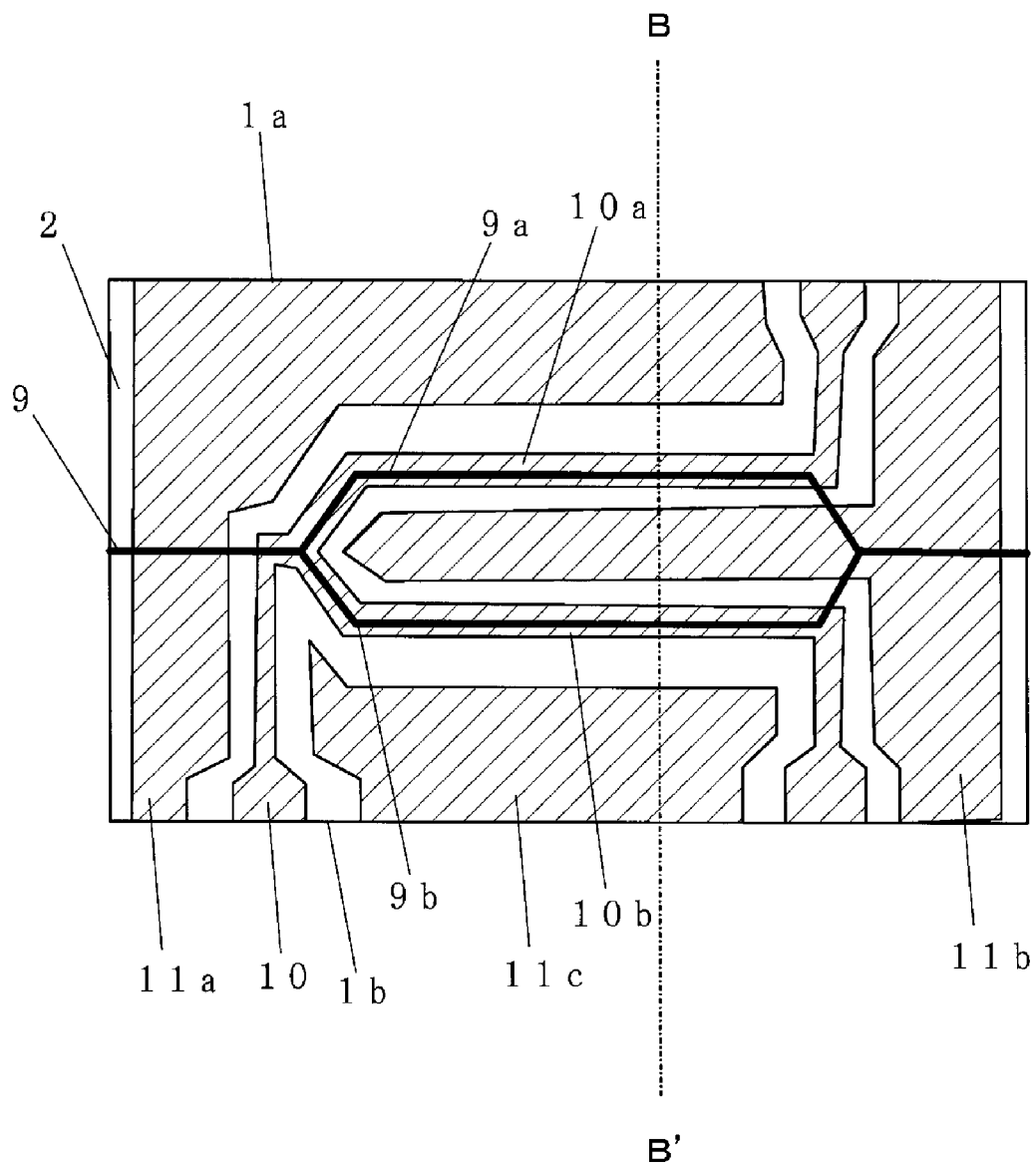
FIG. 11 is a top view showing the optical modulation device according to the third example of the prior art.
Figure 12:
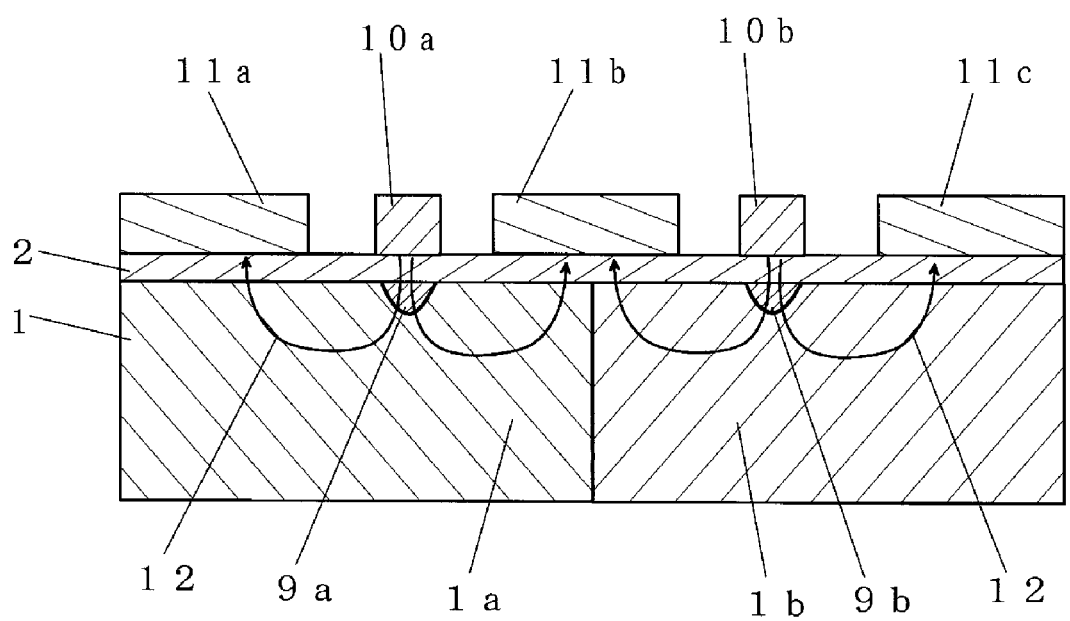
FIG. 12 is a sectional view taken along the line B-B' of FIG. 11.
Figure 13:
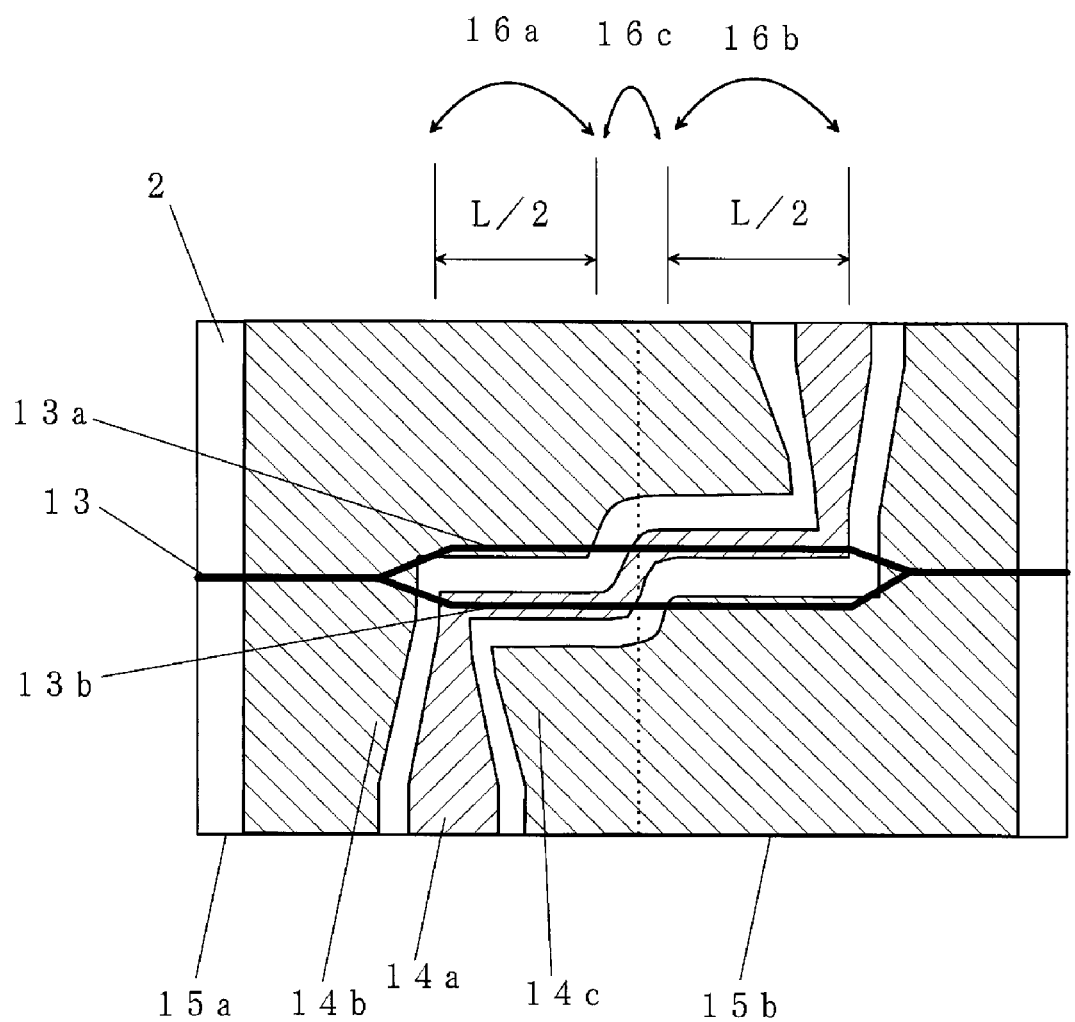
FIG. 13 is a schematic view showing the optical modulation device according to the fourth example of the prior art.

While there has been shown in FIG. 1 that the microwave output port is positioned with the microwave input port across the first and the second branched optical waveguide portions 18a and 18b, the microwave output port and the microwave input port may be positioned on the same side with respect to the first and the second branched optical waveguide portions 18a and 18b in a similar manner to the optical modulation device according to the first example of the prior art shown in FIG. 7. There has also been described about the fact that the polarization reversal process is worked in the whole half region of the z-cut LN substrate where the second interaction sub-portion 20b is formed. However, the polarization reversal process may be worked only at the second interaction sub-portion 20b and in the proximity thereof. There has also been described about the fact that the polarization reversal process is worked between the top surface and the bottom surface of the z-cut LN substrate in FIG. 2. However, the polarization reversal process may be worked only around the top surface of the z-cut LN substrate where the Mach-Zehnder optical waveguide 18 is formed. The facts as above described may be applied not only to this embodiment but also to other embodiments of this invention.

The simplest structure of the LN optical modulation device according to this embodiment is realized with the length L1 of the first interaction sub-portion 20a and the length L2 of the second interaction sub-portion 20b substantially equal to each other. Even in this case, the second interaction sub-portion 20b ensures the chirping of the optical signal pulse to be smaller than that of the optical signal pulse formed by the optical modulation device according to the first example of the prior art shown in FIG. 7.

Here, as the electric signal is transmitted through the traveling wave electrode formed by the center electrode 19a and the ground electrodes 19b and 19c, the electric signal is attenuated due to the conductor loss of the traveling wave electrode under the condition that the electric signal has high frequency. The intensity of the electric signal at the second interaction sub-portion 20b is, therefore, weaker than that of the electric signal at the first interaction sub-portion 20a. Therefore, the phase difference at the first branched optical waveguide portion 18a of the second interaction sub-portion 20b and the phase difference at the second branched optical waveguide portion 18b of the first interaction sub-portion 20a respectively have the absolute values different from each other as the frequency of the electric signal is getting higher, under the condition that the length L1 of the first interaction sub-portion 20a and the length L2 of the second interaction sub-portion 20b are equally set at L/2.

Accordingly, the first method of further reducing the chirping is to set the length L1 of the first interaction sub-portion 20a in the polarization non-reversal region shorter than the length L2 of the second interaction sub-portion 20b in the polarization reversal region (L1<L2) to ensure that the chirping of the optical signal pulse outputted from the optical modulation device is suppressed.

The second method of further reducing the chirping is to set the length L1 of the first interaction sub-portion 20a and the length L2 of the second interaction sub-portion 20b at appropriate values in such a manner that the signs of the "α" parameter at a low frequency range near DC and at a high frequency range become opposite with each other while setting the "α" parameter at zero at a predetermined frequency, where the polarization reversal process is not worked at the first interaction sub-portion 20a while the polarization reversal process is worked at the second interaction sub-portion 20b. Here, it is important to set the average value of the "α" parameter at zero over a predetermined frequency range necessary to generate the optical signal pulse. It would therefore be difficult to sufficiently reduce the chirping of the optical signal pulse in case that the "α" parameter has only one of the plus and the minus signs over the whole frequency range with the "α" parameter being set at zero only at a specific frequency.

The third method of further reducing the chirping is to set an integration value of the "α" parameter, representing the amount of chirping, substantially at zero, where integration is performed from the DC to a predetermined maximum frequency contained by the optical signal pulse, the frequency serving as a parameter. This condition can be cleared by setting the length L1 of the first interaction sub-portion 20a and the length L2 of the second interaction sub-portion 20b at appropriate values, where the polarization reversal process is not worked at the first interaction sub-portion 20a while the polarization reversal process is worked at the second interaction sub-portion 20b.

The aforementioned three methods of suppressing the chirping can be applied not only to the optical modulation device according to the first embodiment of this invention where the positions of the branched optical waveguide portions relative to the center and ground electrodes are interchanged once, but also the optical modulation devices according to any other embodiments of this invention such as for example the one having a plurality of interchanges of the aforementioned relative positions.

There has been described about the fact that the traveling wave electrode is formed straight at the interaction portion while the branched optical waveguide portions are shifted at the optical waveguide shift sub-portion 20c. However, it is within the scope of the invention that the first branched optical waveguide portion 18a and the second branched optical waveguide portion 18b are shifted while the traveling wave electrode is shifted to the extent that the transmission characteristic (S21) and the reflection characteristic (S11) of the microwave are not practically deteriorated. This constitution will be described in the third embodiment of this invention.

The positions of the center and the ground electrodes relative to the optical waveguides are required to be interchanged between the polarization non-reversal region and the polarization reversal region in order to sufficiently suppress the chirping. The fundamental concept of this invention, forming the shifted optical waveguide, makes it possible to reduce the amount of shifting the traveling wave electrode in order to sufficiently suppress the chirping. Therefore, the optical modulation device can have a wide modulation bandwidth by shifting the optical waveguides even in the case that the traveling wave electrode is shifted with the similar manner to the fourth example of the prior art by the reason that the deterioration of the microwave characteristics is reduced. This constitution can be applied to all embodiments of this invention.

Second Embodiment

Figure 4:
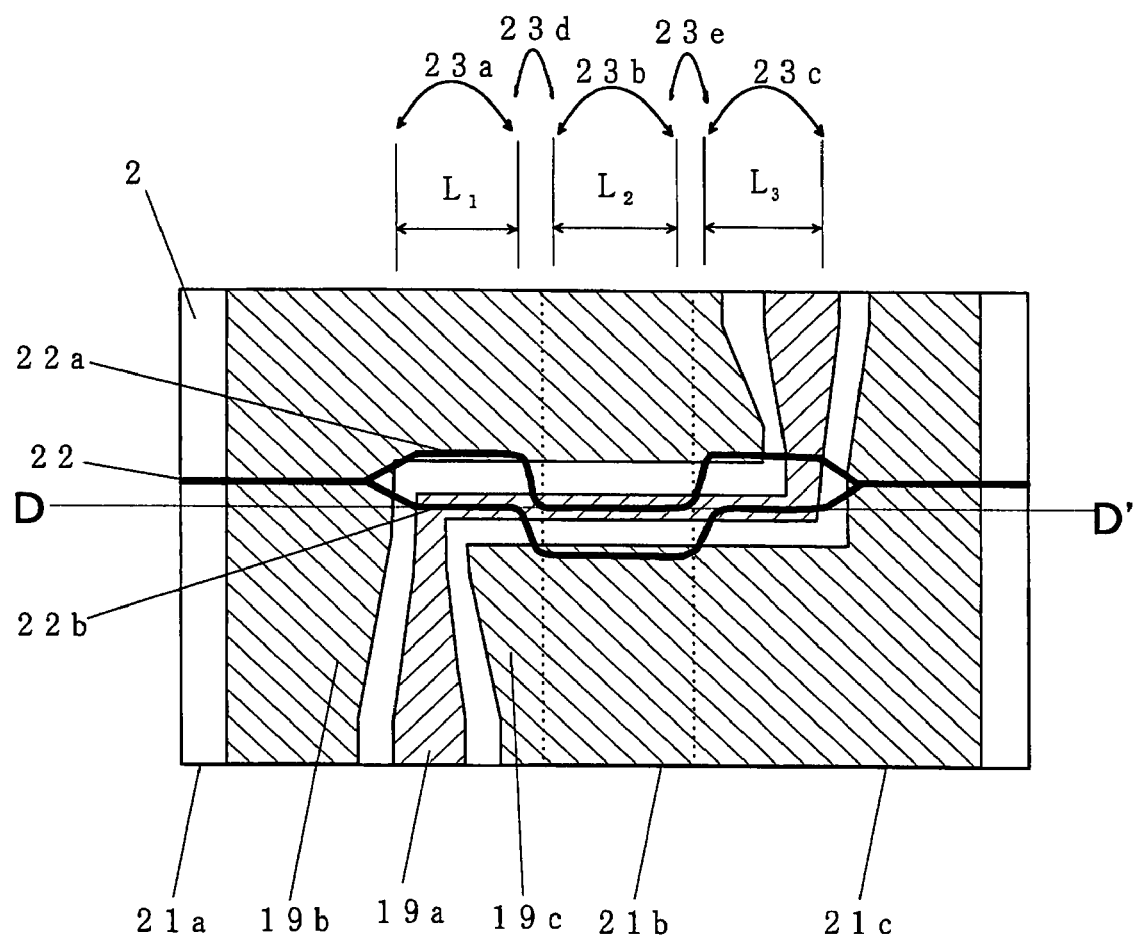
FIG. 4 is a top view showing the optical modulation device according to the second embodiment of the present invention.
Figure 5:
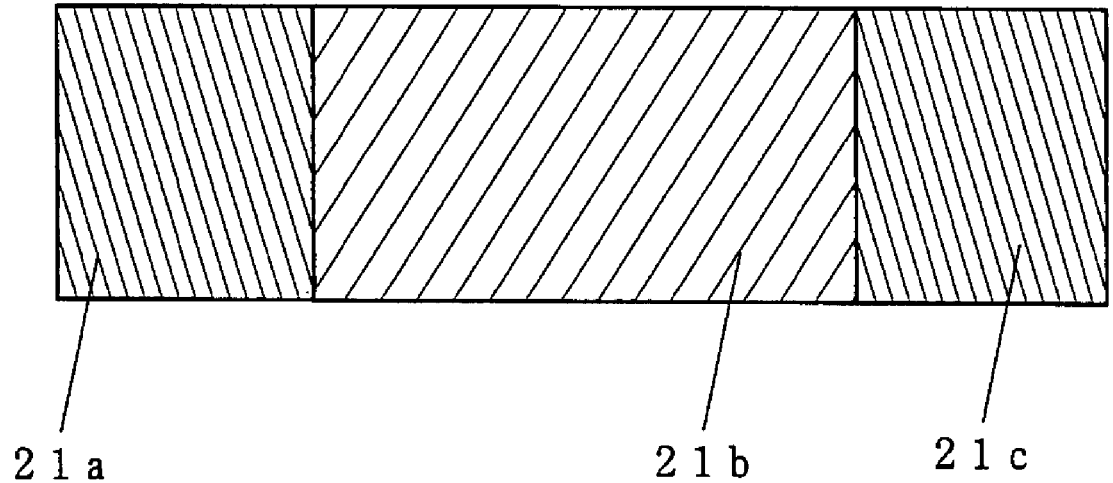
FIG. 5 is a sectional view taken along the line D-D' of FIG. 4.

FIG. 4 is a top view showing the optical modulation device according to the second embodiment of the present invention. FIG. 5 is a sectional view taken along the line D-D' of FIG. 4. The optical modulation device according to this embodiment comprises a $SiO_2$ buffer layer identical with the one shown in FIG. 7. However, the $SiO_2$ buffer layer is not shown in FIG. 4 to avoid the tedious explanation. The constituent elements such as the traveling wave electrode and the optical waveguide are not shown along with the $SiO_2$ buffer layer in FIG. 5 to exclusively show the z-cut LN substrate.

As shown in FIGS. 4 and 5, the optical modulation device according to this embodiment comprises a z-cut LN substrate having regions without polarization reversal (polarization non-reversal regions) 21a and 21c, and a region with polarization reversal (polarization reversal region) 21b. The optical modulation device further comprises a Mach-Zehnder optical waveguide 22 including two arms, that is, a first branched optical waveguide portion 22a and a second branched optical waveguide portion 22b. The optical modulation device further comprises a CPW traveling wave electrode constituted by a center electrode 19a and two ground electrodes 19b and 19c, the CPW identical with the one according to the first embodiment of the present invention shown in FIG. 1.

The center electrode 19a and the ground electrodes 19b and 19c having narrow widths and being separated with narrow gaps are formed substantially straight not to have any discontinuity portion. Alternatively, the first branched optical waveguide portion 22a and the second branched optical waveguide portion 22b are shifted twice in the surface direction. The optical modulation device has a first interaction sub-portion 23a where the electric signal and the incident light are interacted with each other in the polarization non-reversal region 21a. The optical modulation device further has a second interaction sub-portion 23b where the electric signal and the incident light are interacted with each other in the polarization reversal region 21b. In addition, the optical modulation device has a third interaction sub-portion 23c where the electric signal and the incident light are interacted with each other in the polarization non-reversal region 21c. The optical modulation device further has an optical waveguide shift sub-portion 23d positioned between the first interaction sub-portion 23a and the second interaction sub-portion 23b, and an optical waveguide shift sub-portion 23e positioned between the second interaction sub-portion 23b and the third interaction sub-portion 23c.

The optical modulation device according to the present invention, therefore, makes it possible to sufficiently reduce the transmission loss and the reflection of the electric signal, i.e., the microwave with the branched optical waveguide portions shifted due to the fact that the discontinuity portion, where the traveling wave electrode is shifted, is not necessary to be formed. In addition, the positions of the first and the second branched optical waveguide portions 22a and 22b relative to the center electrode 19a and the ground electrodes 19b and 19c are interchanged between the two adjacent interaction sub-portions, which makes it possible to realize the wide optical modulation bandwidth while sufficiently reducing the chirping of the optical signal pulse generated by the optical modulation device.

As described above, the conductor loss is increased as the frequency of the electric signal is higher. Accordingly, the electric signal, interacting with the incident lights passing through the first and the second branched optical waveguide portions 22a and 22b, has the strongest intensity at the first interaction sub-portion 23a, the weakest intensity at the third interaction sub-portion 23c, and the middle intensity at the second interaction sub-portion 23b.

Therefore, it is effective in reducing the chirping to set the lengths L1, L2 and L3 as L1=L3=L2/2. In addition, the same method as described in the first embodiment with the constitution shown in FIG. 1 can be applied to set these lengths to further reduce the chirping.

In other words, the length L1 of the first interaction sub-portion 23a in the polarization non-reversal region, the length L2 of the second interaction sub-portion 23b in the polarization reversal region, and the length L3 of the third interaction sub-portion 23c in the polarization non-reversal region can appropriately be set in such a manner that the signs of the "α" parameter at a low frequency range near DC and at a high frequency range become opposite with each other while setting the "α" parameter at zero at a predetermined frequency.

Here, it is important to set the average value of the "α" parameter at zero over a predetermined frequency range necessary to generate the optical signal pulse. It would therefore be difficult to sufficiently reduce the chirping of the optical signal pulse in case that the "α" parameter has only one of the plus and the minus signs over the whole frequency range with the "α" parameter being set at zero only at a specific frequency.

Another method of further reducing the chirping is to set an integration value of the "α" parameter, the "α" parameter representing the amount of chirping, substantially at zero, where integration is performed from the DC to a predetermined maximum frequency contained by the optical signal pulse, the frequency serving as a parameter. This condition can be cleared by setting at respective appropriate values the length L1 of the first interaction sub-portion 23a in the region where the polarization reversal process is not worked (polarization non-reversal region), the length L2 of the second interaction sub-portion 23b in the region where the polarization reversal process is worked (polarization reversal region), and the length L3 of the third interaction sub-portion 23c in the region where the polarization reversal process is not worked (polarization non-reversal region).

Third Embodiment

Figure 6:
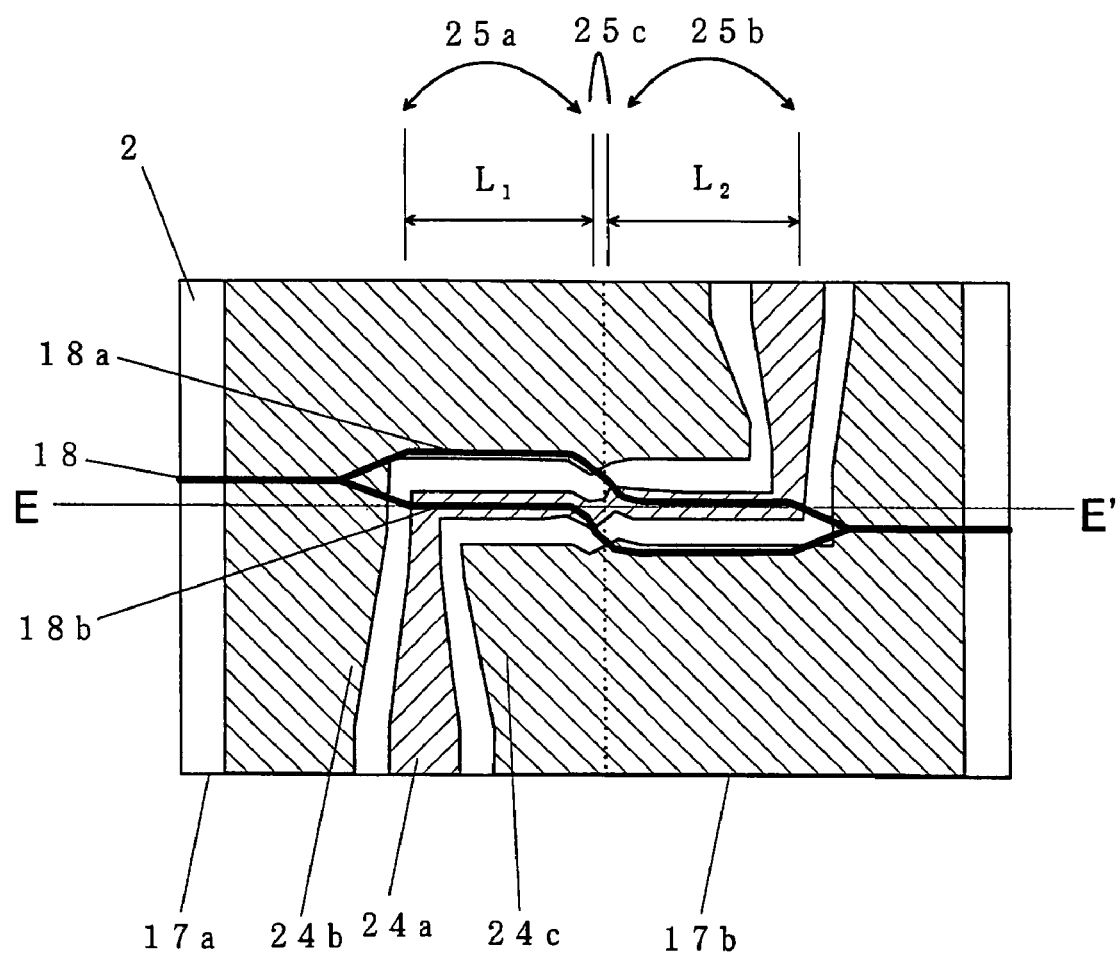
FIG. 6 is a top view showing the optical modulation device according to the third embodiment of the present invention.

FIG. 6 is a top view showing the optical modulation device according to the third embodiment of the present invention. The sectional view taken along the line E-E' of FIG. 6 is identical with the sectional view shown in FIG. 2. It is necessary for the LN substrate to have a buffer layer made of $SiO_2$ mounted thereon due to the fact that the LN substrate has a z-cut state in this embodiment, which is the same as the first example of the prior art shown in FIG. 7. The $SiO_2$ buffer layer, however, will not be described in this embodiment to avoid the tedious explanation.

As aforementioned, the traveling wave electrode is formed straight at the interaction portion while the position of the branched optical waveguide portions are shifted at the optical waveguide shift sub-portion 20c in the first embodiment of the present invention as shown in FIG. 1. Meanwhile, the first branched optical waveguide portion 18a and the second branched optical waveguide portion 18b are shifted while the center and the ground electrodes 24a to 24c of the traveling wave electrode are shifted, according to the third embodiment, to the extent that the transmission characteristic (S21) and the reflection characteristic (S11) of the microwave are not practically deteriorated, and to the extent that the process of forming the traveling wave electrode is worked without difficulty. This makes it possible for the part of the optical waveguide shift sub-portion 25c to additionally modulate the incident light, which results in the fact that the length L1 of the first interaction sub-portion 25a and the length L2 of the second interaction sub-portion 25b are virtually longer than that of the optical modulation device according to the first embodiment. Therefore, the optical modulation device according to this embodiment can realize better modulation efficiency than that of the optical modulation device with the straight traveling wave electrode according to the first embodiment of the present invention.

There has been described about the fact that the widths of the center electrode and the gaps between the center electrode and the ground electrodes respectively set at the interaction sub-portions are equal with one another. However, the widths and the gaps set to the respective interaction sub-portions may have values different from each other.

Though there has been described about the fact that the Mach-Zehnder optical waveguide exemplifies the branch-type optical waveguide, it goes without saying that the principle of this invention can be applied to the optical waveguide having a bifurcation portion and a mix portion exemplified by an optical directional coupler. In addition, the principle of this invention can be applied to the optical waveguide constituted by more than two branched optical waveguide portions. The optical waveguide may be formed with any methods exemplified by a proton exchange method to replace the method of titanium thermal diffusion. In a similar manner, the buffer layer may be made of any materials to replace the $SiO_2$.

Though there has been described about the fact that the electrode is constituted by the CPW, the electrode may be formed by an asymmetric coplanar strip (ACPS), symmetric coplanar strip (CPS) or the like. Though there has been described about the fact that the z-cut LN substrate has one polarization reversal region, the z-cut LN substrate may have more than one polarization reversal region. In this case, the polarization non-reversal regions and the polarization reversal regions are alternately positioned in the longitudinal direction.

The method of reducing the velocity difference between the electric signal and the incident light commonly utilized in the prior art, such as for example, forming a thick traveling wave electrode and a thick buffer layer, can be applied to the LN optical modulation device according to this invention. In addition, it goes without saying that the output portion for outputting the electric signal may be terminated with a terminator having an impedance such as 40Ω and 50Ω.

INDUSTRIAL APPLICABILITY OF THE PRESENT INVENTION

In accordance with the present invention, there is provided an optical modulation device which can avoid forming a traveling wave electrode with considerable winding where the traveling wave electrode requires high fabrication technology, stemming from the fact that the optical modulation device has an optical waveguide shift sub-portion to make the positions of the first and the second branched optical waveguide portions relative to the center and the ground electrodes interchanged between the first interaction sub-portion and the second interaction sub-portion. Therefore, the optical modulation device can sufficiently reduce the deterioration of the characteristics of the electric signal, i.e., the microwave, thereby resulting in the optical modulation device available for outputting the optical signal pulse with the chirping sufficiently reduced.

What is claimed is:

1. An optical modulation device for generating an optical signal pulse, comprising:
a substrate having an electro-optic effect, said substrate having a polarization non-reversal region and a polarization reversal region;
an optical waveguide formed upper said substrate including a bifurcation optical waveguide for bifurcating incident light, first and second branched optical waveguide portions for transmitting bifurcated incident lights, and a mixing waveguide for mixing incident lights respectively transmitted by said first and second branched optical waveguide portions; and
a traveling waveguide including a center electrode and a ground electrode to have an electric signal applied thereto, said traveling waveguide and said first and second branched optical waveguide portions collectively forming an interaction portion to have said incident light interacted with said electric signal, said interaction portion including a first interaction sub-portion and a second interaction sub-portion, said first and second interaction sub-portions being respectively positioned in regions of said substrate having opposite polarization orientations with each other, in which
said center electrode is positioned in face to face relationship with one of said first and second branched optical waveguide portions at said first interaction sub-portion and the other of said first and second branched optical waveguide portions at said second interaction sub-portion to ensure that said incident light in said first and second branched optical waveguide portions are phase modulated,
said interaction portion further includes an optical waveguide shift sub-portion sandwiched between said first and second interaction sub-portions to have positions of said first and second branched optical waveguide portions shifted therein such that the optical axes of said first optical waveguide at said first and second interaction sub-portions are in spaced relationship with each other while the optical axes of said second optical waveguide at said first and second interaction sub-portions being in spaced relationship with each other, ensuring that positions of said first and second branched optical waveguide portions relative to said center and ground electrodes are interchanged between said first and second interaction sub-portions, and
said center electrode of said interaction portion is formed substantially straight in such a manner that said traveling waveguide is formed straight not to have any discontinuity portion at the interaction portion.

2. An optical modulation device as set forth in claim 1, in which
said first and second interaction sub-portions have longitudinal lengths equal to each other.

3. An optical modulation device as set forth in claim 1, in which
said first interaction sub-portion has a longitudinal length shorter than the longitudinal length of said second interaction sub-portion.

4. An optical modulation device as set forth in claim 1, in which
said substrate has at least one of additional polarization non-reversal region and additional polarization reversal region sectioned in said interaction portion, and has at least one additional optical waveguide shift sub-portion to ensure that said optical waveguide shift sub-portions are respectively sectioned over boundaries of said polarization reversal regions and said polarization non-reversal regions.

5. An optical modulation device as set forth in claim 4, in which
the addition of said polarization non-reversal regions and said polarization reversal regions in number amounts to odd numbers other than "1" in numerical number.

6. An optical modulation device as set forth in claim 5, in which
total longitudinal length of said polarization non-reversal regions and total longitudinal length of said polarization reversal regions in said interaction portion are equal to each other.

7. An optical modulation device as set forth in one of claims 1 to 6, in which
said optical signal pulse is smaller in chirping than that of the optical signal pulse outputted by a substitute optical modulation device having a substitute substrate sectioned by either one of said polarization non-reversal region and said polarization reversal region.

8. An optical modulation device for generating an optical signal pulse, comprising:
a substrate having an electro-optic effect, said substrate having a polarization non-reversal region and a polarization reversal region;
an optical waveguide formed upper said substrate including a bifurcation optical waveguide for bifurcating incident light, first and second branched optical waveguide portions for transmitting bifurcated incident lights, and a mixing waveguide for mixing incident lights respectively transmitted by said first and second branched optical waveguide portions; and
a traveling waveguide including a center electrode and a ground electrode to have an electric signal applied thereto, said traveling waveguide and said first and second branched optical waveguide portions collectively forming an interaction portion to have said incident light interacted with said electric signal, said interaction portion including a first interaction sub-portion and a second interaction sub-portion, said first and second interaction sub-portions being respectively positioned in regions of said substrate having opposite polarization orientations with each other, in which
said center electrode is positioned in face to face relationship with one of said first and second branched optical waveguide portions at said first interaction sub-portion and the other of said first and second branched optical waveguide portions at said second interaction sub-portion to ensure that said incident light in said first and second branched optical waveguide portions are phase modulated, and
said interaction portion further includes an optical waveguide shift sub-portion sandwiched between said first and second interaction sub-portions to have positions of said first and second branched optical waveguide portions shifted therein such that the optical axes of said first optical waveguide at said first and second interaction sub-portions are in spaced relationship with each other while the optical axes of said second optical waveguide at said first and second interaction sub-portions being in spaced relationship with each other, ensuring that positions of said first and second branched optical waveguide portions relative to said center and ground electrodes are interchanged between said first and second interaction sub-portions, and part of said center electrode is formed substantially parallel to one of said first and second branched optical waveguide portions at said optical waveguide shift sub-portion, in such a manner that said traveling waveguide is formed not to have any discontinuity portion at the interaction portion.

9. An optical modulation device as set forth in claim 8, in which said first and second interaction sub-portions have longitudinal lengths equal to each other.

10. An optical modulation device as set forth in claim 8, in which said first interaction sub-portion has a longitudinal length shorter than the longitudinal length of said second interaction sub-portion.

11. An optical modulation device as set forth in claim 8, in which said substrate has at least one of additional polarization non-reversal region and additional polarization reversal region sectioned in said interaction portion, and has at least one additional optical waveguide shift sub-portion to ensure that said optical waveguide shift sub-portions are respectively sectioned over boundaries of said polarization reversal regions and said polarization non-reversal regions.

12. An optical modulation device as set forth in claim 11, in which the addition of said polarization non-reversal regions and said polarization reversal regions in number amounts to odd numbers other than "1" in numerical number.

13. An optical modulation device as set forth in claim 12, in which total longitudinal length of said polarization non-reversal regions and total longitudinal length of said polarization reversal regions in said interaction portion are equal to each other.

14. An optical modulation device as set forth in claim 8, in which said optical signal pulse is smaller in chirping than that of the optical signal pulse outputted by a substitute optical modulation device having a substitute substrate sectioned by either one of said polarization non-reversal region and said polarization reversal region.

\* \* \* \* \*